US009971417B2

United States Patent
Matsunaga

(10) Patent No.: US 9,971,417 B2
(45) Date of Patent: May 15, 2018

(54) NETWORK CONTROL SYSTEM, CONTROL APPARATUS, CONTROLLED APPARATUS, AND APPARATUS CONTROL METHOD

(71) Applicant: Panasonic Intellectual Property Management Co., Ltd., Osaka (JP)

(72) Inventor: Shigeki Matsunaga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/134,731

(22) Filed: Apr. 21, 2016

(65) Prior Publication Data

US 2016/0231829 A1    Aug. 11, 2016

Related U.S. Application Data

(63) Continuation of application No. 13/981,580, filed as application No. PCT/JP2011/007282 on Dec. 26, 2011, now Pat. No. 9,348,427.

(30) Foreign Application Priority Data

Jan. 27, 2011    (JP) .................................. 2011-014968

(51) Int. Cl.
    *G06F 3/023*    (2006.01)
    *G08C 17/02*    (2006.01)
    (Continued)

(52) U.S. Cl.
    CPC ............ *G06F 3/0233* (2013.01); *G06F 3/038* (2013.01); *G06F 3/0346* (2013.01); *G08C 17/00* (2013.01);
    (Continued)

(58) Field of Classification Search
    CPC ........ G06F 3/0233; G06F 3/038; G06F 3/067; G06F 11/2071; G06F 2209/544;
    (Continued)

(56) References Cited

U.S. PATENT DOCUMENTS 5,909,183 A * 6/1999 Borgstahl ............... G08C 19/28
                                                    340/10.51
6,466,233 B1    10/2002 Mitani
(Continued)

FOREIGN PATENT DOCUMENTS

JP    2000-217171 A    8/2000
JP    2002-078042 A    3/2002
(Continued)

OTHER PUBLICATIONS

International Search Report issued in PCT/JP2011/007282, dated Jan. 31, 2012.

*Primary Examiner* — Dismery Mercedes
(74) *Attorney, Agent, or Firm* — McDermott Will & Emery LLP

(57) ABSTRACT

A network control system includes a control apparatus and a controlled apparatus. The control apparatus includes: a first execution unit which executes a first application program for operating the controlled apparatus; a display unit which displays an operation screen; an operational command generation unit which generates an operational command in response to an input by a user to the operation screen; and a first communication unit which outputs the operational command. The controlled apparatus includes: a second execution unit which executes a second application program, and identifies an operation type of the controlled apparatus; an operation type information generation unit; and a second communication unit which outputs the operation type information. The first execution unit generates an
(Continued)

operation screen corresponding to the operation type, and the display unit displays the generated operation screen.

3 Claims, 9 Drawing Sheets

(51) Int. Cl.
| | |
|---|---|
| G06F 9/44 | (2018.01) |
| G06F 3/038 | (2013.01) |
| H04N 21/422 | (2011.01) |
| H04L 29/08 | (2006.01) |
| H04L 12/28 | (2006.01) |
| G06F 3/0346 | (2013.01) |
| H04N 21/482 | (2011.01) |
| H04N 21/41 | (2011.01) |
| H04N 21/4782 | (2011.01) |
| G08C 17/00 | (2006.01) |
| H04L 12/24 | (2006.01) |

(52) U.S. Cl.
CPC .......... *G08C 17/02* (2013.01); *H04L 12/2834* (2013.01); *H04L 41/22* (2013.01); *H04L 67/025* (2013.01); *H04N 21/4126* (2013.01); *H04N 21/4222* (2013.01); *H04N 21/42204* (2013.01); *H04N 21/42208* (2013.01); *H04N 21/42214* (2013.01); *H04N 21/42224* (2013.01); *H04N 21/4782* (2013.01); *H04N 21/4828* (2013.01); *G08C 2201/30* (2013.01); *G08C 2201/40* (2013.01)

(58) Field of Classification Search
CPC ..... G06F 9/4443; H04L 67/42; H04L 67/025; H04L 41/22; H04L 41/12; G08C 2201/93; G08C 17/00; G08C 17/02; G08C 2201/30; G08C 2201/50; H04N 21/4126; H04N 21/42208; H04N 21/42214; H04N 21/42224; H04N 21/4828; H04N 21/4222; H04N 21/42204
See application file for complete search history.

(56) References Cited

U.S. PATENT DOCUMENTS

| | | | | |
|---|---|---|---|---|
| 6,633,281 | B2 | 10/2003 | Lin et al. | |
| 7,027,881 | B2* | 4/2006 | Yumoto | G08C 17/02 700/168 |
| 7,158,047 | B2* | 1/2007 | Ushida | G08C 19/28 340/12.54 |
| 7,170,422 | B2 | 1/2007 | Nelson et al. | |
| 7,174,518 | B2* | 2/2007 | Kim | G06F 3/03547 348/E5.103 |
| 7,345,593 | B2* | 3/2008 | Park | G08C 23/04 340/12.28 |
| 7,404,518 | B2* | 7/2008 | Nakamura | G06F 3/0482 235/382 |
| 7,477,321 | B2 | 1/2009 | Yokoyama et al. | |
| 7,534,593 | B2 | 5/2009 | Corbett et al. | |
| 7,999,653 | B2* | 8/2011 | Kubo | G05B 15/02 340/10.5 |
| 8,001,573 | B2 | 8/2011 | Sakao et al. | |
| 8,032,833 | B1 | 10/2011 | Wang et al. | |
| 8,054,294 | B2 | 11/2011 | Sakai et al. | |
| 8,102,373 | B2 | 1/2012 | Kwon | |
| 8,232,906 | B2 | 7/2012 | Kim | |
| 8,233,001 | B2* | 7/2012 | Onozawa | G09G 5/006 345/522 |
| 8,344,859 | B2* | 1/2013 | Reams | H04N 21/42225 340/10.5 |
| 8,375,328 | B2 | 2/2013 | Koh et al. | |
| 8,548,453 | B2* | 10/2013 | Jeon | G08C 17/02 455/411 |
| 8,612,636 | B2* | 12/2013 | Yu | H04L 67/16 709/227 |
| 8,958,018 | B2* | 2/2015 | Sibilsky | G06F 3/033 345/2.3 |
| 9,065,876 | B2* | 6/2015 | Huang | H04L 65/4092 |
| 9,081,547 | B2* | 7/2015 | Kalu | G06F 1/1654 |
| 9,119,043 | B2* | 8/2015 | Shaikh | H04L 67/125 |
| 9,348,427 | B2* | 5/2016 | Matsunaga | G08C 17/02 |
| 9,466,207 | B2* | 10/2016 | Jang | G08C 17/00 |
| 9,552,079 | B2* | 1/2017 | Papstein | H04M 1/7253 |
| 2002/0035621 | A1* | 3/2002 | Zintel | H04L 12/2805 709/220 |
| 2003/0080874 | A1 | 5/2003 | Yumoto et al. | |
| 2005/0068151 | A1* | 3/2005 | Ushida | G08C 19/28 340/3.71 |
| 2005/0174489 | A1 | 8/2005 | Yokoyama et al. | |
| 2009/0165105 | A1 | 6/2009 | Chaudhry | |
| 2010/0215375 | A1* | 8/2010 | Reams | G08C 17/02 398/107 |
| 2011/0043326 | A1* | 2/2011 | Lee | H04N 7/163 340/5.8 |
| 2011/0113353 | A1* | 5/2011 | Koh | G06F 3/0488 715/760 |
| 2011/0138444 | A1* | 6/2011 | Kang | G06F 21/31 726/3 |
| 2012/0127081 | A1* | 5/2012 | Lin | G06F 3/021 345/169 |

FOREIGN PATENT DOCUMENTS

| | | |
|---|---|---|
| JP | 2003-143670 A | 5/2003 |
| JP | 2003-333359 A | 11/2003 |
| JP | 2004-201133 A | 7/2004 |
| JP | 2005-101887 A | 4/2005 |
| JP | 2005-234913 A | 9/2005 |
| JP | 2006-345240 A | 12/2006 |
| JP | 2010-183438 A | 8/2010 |

* cited by examiner

NETWORK CONTROL SYSTEM, CONTROL APPARATUS, CONTROLLED APPARATUS, AND APPARATUS CONTROL METHOD

RELATED APPLICATIONS

This application is a Continuation of U.S. patent application Ser. No. 13/981,580 filed on Jul. 24, 2013, now U.S. Pat. No. 9,348,427, which is the U.S. National Phase under 35 U.S.C. § 371 of International Application No. PCT/JP2011/007282, filed on Dec. 26, 2011, which claims the benefit of Japanese Application No. 2011-014968, filed on Jan. 27, 2011, the disclosures of which Applications are incorporated by reference herein.

TECHNICAL FIELD

The present invention relates to apparatuses connected to a network, such as digital home electronic apparatuses and mobile terminals typified by smartphones, and particularly relates to a network control system including a control apparatus which operates a controlled apparatus via a network.

BACKGROUND ART

Conventionally, digital home electronic apparatuses such as digital televisions (hereinafter referred to as DTV) and HDD recorders are provided with remote controllers dedicated to these apparatuses, and users operate these apparatuses through the remote controllers.

Furthermore, in general, a remote controller has buttons (also referred to as "keys"), such as a channel button and a mute button, each assigned with a function. With such a conventional remote controller, the users can operate the apparatus very comfortably as long as he/she uses each button only for the assigned function.

However, digital home electronic apparatuses available in recent years provide keyword search function and Internet browsing function, whereby the users have more opportunities to enter characters.

When the user enters characters using the conventional remote controller however, he/she generally selects a target character by pressing down a channel number button and the like several times. In other words, with the conventional remote controller, users cannot enter characters into digital home electronic apparatuses in an intuitive manner but have to get used to the operation, which has been proven to be troublesome to the users.

Accordingly, a technique has been disclosed in which a mobile terminal that is suitable for entering characters, such as a mobile phone, is used as a remote controller for a digital home electronic apparatus instead of the remote controller provided for the apparatus (for example, see Patent Literature (PTL) 1). With the above technique, the user can use an input unit such as a keyboard of the mobile terminal when entering characters, while using the mobile terminal for performing the same operation as the remote controller provided for the apparatus. The above technique aims at improving the operability in the above manner.

CITATION LIST

Patent Literature

[PTL 1] Japanese Unexamined Patent Application Publication No. 2002-078042

SUMMARY OF INVENTION

Technical Problem

However, with the conventional technique disclosed in PTL 1, the user is required to: determine whether or not the digital home electronic apparatus being operated is in a character input state; and when it is determined that the digital home electronic apparatus is in the character input state, input characters using a keyboard.

In other words, the user has to understand the state of the digital home electronic apparatus to be operated, and select an optimal operation scheme. Accordingly, the conventional technique has a problem in that the user cannot select the optimal operation scheme well when, for example, more than two operation schemes are available.

The present invention has been conceived in view of the above problem, and has an object to provide a network control system, a control apparatus, a controlled apparatus, and an apparatus control method which allows the control apparatus to operate the controlled apparatus more efficiently.

Solution to Problem

A network control system according to an aspect of the present invention is a network control system including a control apparatus and a controlled apparatus which performs processing corresponding to an operational command transmitted from the control apparatus via a network, wherein the control apparatus includes: a first execution unit configured to execute a first application program for operating the controlled apparatus; a display unit configured to display an operation screen generated through the execution of the first application program; an operational command generation unit configured to generate the operational command in response to an input by a user to the operation screen displayed on the display unit; and a first communication unit configured to output the generated operational command to the network, the controlled apparatus includes: a second execution unit configured to execute a second application program, and identify an operation type which is corresponding to processing performed by the second application program and is a type of operation accepted by the controlled apparatus; an operation type information generation unit configured to generate operation type information indicating the identified operation type; and a second communication unit configured to output the generated operation type information to the network, the first execution unit is configured to receive the operation type information via the first communication unit, and generate an operation screen corresponding to the operation type indicated in the operation type information by executing the first application program, and the display unit is configured to display the generated operation screen.

With this configuration, the controlled apparatus can identify the operation type of the controlled apparatus, and notify the operation type to the control apparatus. Furthermore, the control apparatus can generate and display an operation screen corresponding to the notified operation type.

Thus, an operation screen suitable for the current operation type of the controlled apparatus is displayed on the control apparatus. As a result, the control apparatus can operate the controlled apparatus efficiently.

Furthermore, in the network control system according to an aspect of the present invention, the operation type information generation unit may be configured to generate the operation type information indicating at least one of a keyboard type and a character string input scheme for use in the identified operation type, and the first execution unit may be configured to generate the operation screen corresponding to the at least one of the keyboard type and the character string input scheme indicated in the operation type information.

With this configuration, the operation screen corresponding to the at least one of the keyboard type and the character string input scheme suitable for operation of the controlled apparatus is displayed on the control apparatus.

This allows, for example, automatically presenting to the user the operation screen corresponding to the type of characters to be transmitted to the controlled apparatus. As a result, the control apparatus can operate the controlled apparatus more efficiently.

Furthermore, in the network control system according to an aspect of the present invention, the second execution unit may be configured to identify an operation type after the change when the operation type has changed, the operation type information generation unit may be configured to generate operation type information indicating the operation type after the change, the first execution unit may be configured to generate an operation screen corresponding to the operation type after the change indicated in the operation type information received via the first communication unit, and the display unit may be configured to display the generated operation screen corresponding to the operation type after the change.

With this configuration, when the operation type of the controlled apparatus changes, an operation screen suitable for the operation type after the change is displayed on the control apparatus. In other words, even when the operation type of the controlled apparatus changes again and again, the controlled apparatus can switch between the operation screens in response to the change.

Furthermore, in the network control system according to an aspect of the present invention, the operation type information generation unit may be further configured to generate capacity information on processing capacity of the controlled apparatus, the second communication unit may be further configured to output the generated capacity information to the network, and the first execution unit may be configured to receive the capacity information via the first communication unit, and generate the operation screen corresponding to the operation type indicated in the operation type information and the processing capacity indicated in the capacity information.

With this configuration, the capacity information indicating languages that can be interpreted by the controlled apparatus and so on is transmitted to the control apparatus via the network. Thus, the control apparatus can generate and display an operation screen corresponding to the operation type and the processing capacity of the controlled apparatus. As a result, the control apparatus can operate the controlled apparatus more efficiently.

Furthermore, in the network control system according to an aspect of the present invention, the operational command generation unit may be configured to generate the operational command corresponding to the input from the user to the operation screen, the operational command complying with Universal Plug and Play (UPnP) protocol.

With this configuration, UPnP protocol, which is a generic communication protocol, can be adopted as a communication protocol between the control apparatus and the controlled apparatus. As a result, for example, it becomes easier to establish the network control system.

Furthermore, in the network control system according to an aspect of the present invention, the control apparatus may further include a touch-pad control unit configured to obtain operation information identified from gesture input from the user to the operation screen, and the operational command generation unit may be configured to generate the operational command corresponding to the operation information obtained by the touch-pad control unit.

With this configuration, gesture input is allowed to the control apparatus, which is the apparatus that the user actually operates, whereby the control apparatus can operate the controlled apparatus more efficiently.

Furthermore, the control apparatus according to an aspect of the present invention can be realized as a control apparatus including a characteristic constituent element of the control apparatus in the network control system according to any one of the above aspects.

Furthermore, the controlled apparatus according to an aspect of the present invention can be realized as a controlled apparatus including a characteristic constituent element of the controlled apparatus in the network control system according to any one of the above aspects.

Furthermore, the apparatus control method according to an aspect of the present invention can be realized as an apparatus control method including characteristic processing performed by the network control system according to any one of the above aspects.

It is to be noted that the present invention can also be realized as a program which causes a computer to execute the apparatus control method according to an aspect of the present invention. Furthermore, such a program can be distributed via a recording medium such as a CD-ROM or a transmission medium such as the Internet.

Moreover, the present invention can also be realized as an integrated circuit including a characteristic constituent element of the control apparatus according to an aspect of the present invention.

Moreover, the present invention can also be realized as an integrated circuit including a characteristic constituent element of the controlled apparatus according to an aspect of the present invention.

Advantageous Effects of Invention

With the present invention, the user can always operate the controlled apparatus such as a digital home electronic apparatus by the optimal scheme, and can make full use of the digital home electronic apparatus more intuitively. In other words, the control apparatus can operate the controlled apparatus efficiently.

DESCRIPTION OF EMBODIMENTS

Embodiment 1

An embodiment according to the present invention is described below with reference to Drawings. It is to be noted that each diagram is a schematic diagram, and thus is not necessarily an exact illustration.

Furthermore, the embodiment described below shows a preferable specific example of the present invention. Numeric values, shapes, constituents, positions and topologies of the constituents, and the like in the embodiment are an example of the present invention, and it should therefore not be construed that the present invention is limited to the embodiment. The present invention is determined only by the statement in Claims. Accordingly, out of the constituents in the following embodiment, the constituents not stated in the independent claims describing the broadest concept of the present invention are not necessary for achieving the object of the present invention and are described as constituents in a more preferable embodiment.

Figure 1:
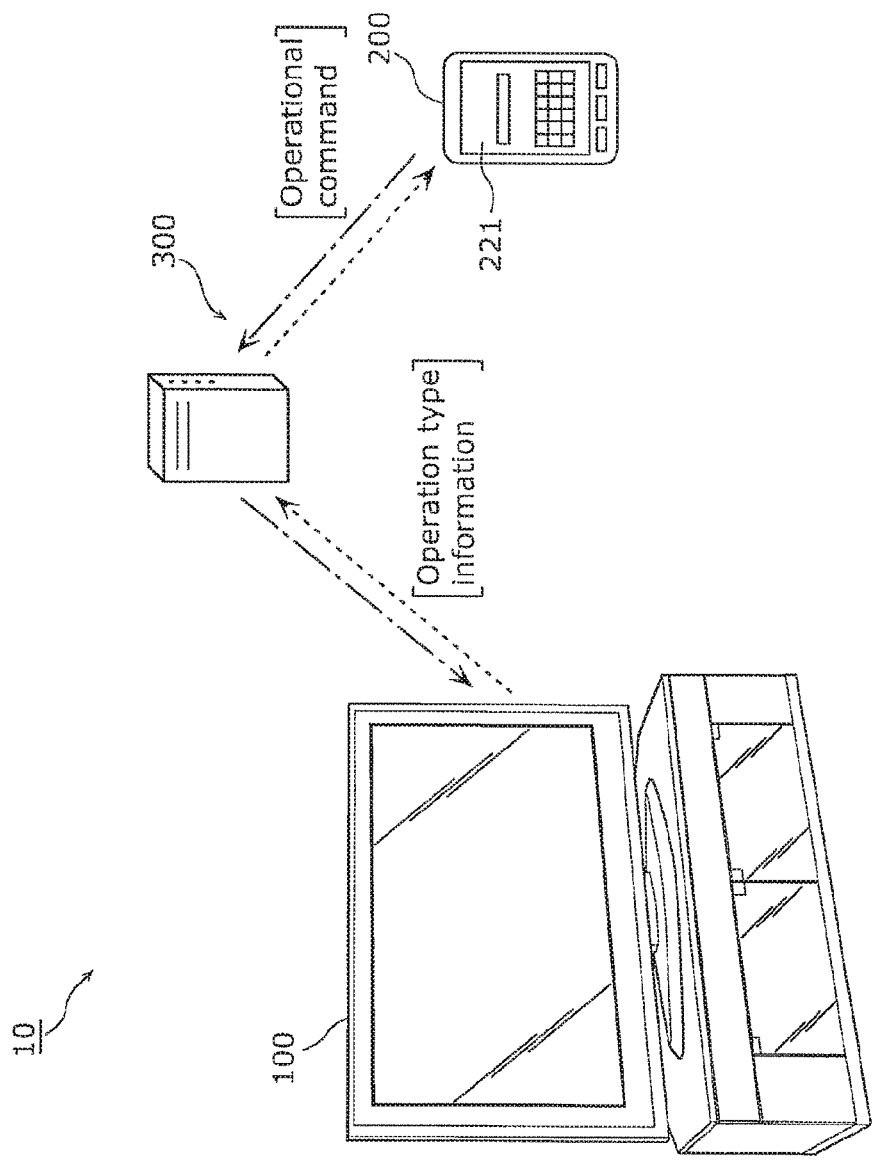
FIG. 1 shows a schematic configuration of a network control system according to an embodiment of the present invention.
Figure 2:
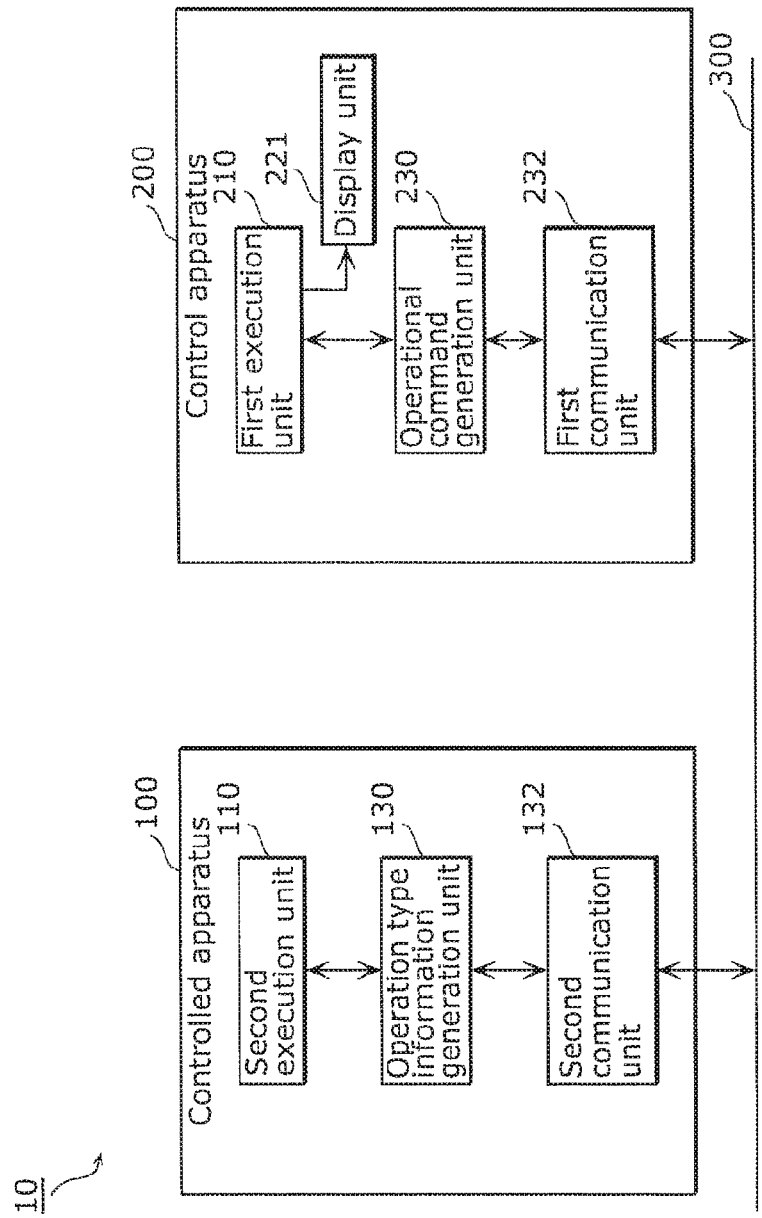
FIG. 2 is a block diagram showing a primary configuration of a control apparatus and a controlled apparatus according to the embodiment.
Figure 3:
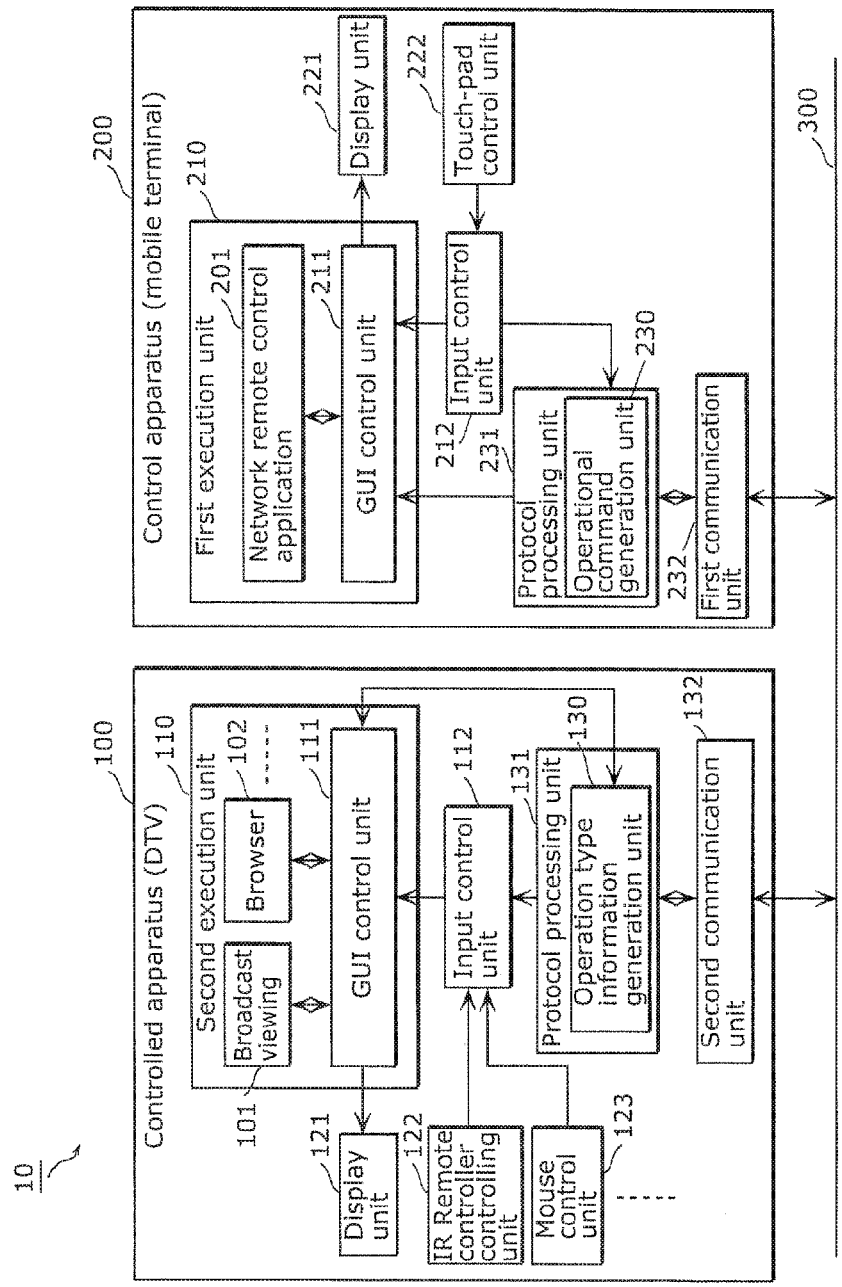
FIG. 3 is a block diagram showing a more specific configuration example of the control apparatus and the controlled apparatus according to the embodiment.

First, description is provided on a configuration of the network control system in the embodiment, with reference to FIG. 1 to FIG. 3.

FIG. 1 shows a schematic configuration of the network control system according to an embodiment of the present invention.

A network control system 10 in the embodiment includes a control apparatus 200, a controlled apparatus 100, and a network 300 which connects the control apparatus 200 and the controlled apparatus 100.

The control apparatus 200 is, for example, a mobile terminal having a touch panel, such as a smartphone, a mobile phone, a remote controller for learning, a personal computer (PC), a portable video game player, and so on.

Furthermore, the controlled apparatus 100 is a digital home electronic apparatus, for example, a DTV, a hard disk drive (HDD) recorder, or a Blu-ray disc (BD) (registered trademark) player.

The controlled apparatus 100 is connected to the control apparatus 200 via the network 300, and is controlled by the control apparatus 200. Specifically, the controlled apparatus 100 receives the operational command transmitted from the control apparatus 200, and performs processing corresponding to the received operational command.

Furthermore, in the present embodiment, the controlled apparatus 100 can notify the operation type of the controlled apparatus 100 (a type of operation accepted by the controlled apparatus 100) to the control apparatus 200. Furthermore, the control apparatus 200 can display on the display unit 221 an operation screen corresponding to the notified operation type.

The network 300 connects a plurality of apparatuses one another via, for example, a wireless local area network (LAN) router. It is to be noted that wired communication may be used for a part or the entire communication route between the control apparatus 200 and the controlled apparatus 100.

FIG. 2 is a block diagram showing a primary configuration of the control apparatus 200 and the controlled apparatus 100 according to the embodiment.

The control apparatus 200 includes a first execution unit 210, a display unit 221, an operational command generation unit 230, and a first communication unit 232.

The first execution unit 210 executes a first application program for operating the controlled apparatus 100. The display unit 221 displays an operation screen generated through the execution of the first application program.

The operational command generation unit 230 generates the operational command in response to an input by a user to the operation screen displayed on the display unit 221. The first communication unit 232 outputs the generated operational command to the network 300.

Furthermore, the controlled apparatus 100 includes a second execution unit 110, an operation type information generation unit 130, and a second communication unit 132.

The second execution unit 110 executes a second application program, and identifies an operation type which is corresponding to processing performed by the second application program and is a type of operation to the controlled apparatus 100.

The operation type information generation unit 130 generates operation type information indicating the identified operation type. The second communication unit 132 outputs the generated operation type information to the network 300.

The operation type information output from the controlled apparatus 100 to the network 300 in the above manner is received by the control apparatus 200.

Specifically, the first execution unit 210 of the control apparatus 200 receives the operation type information via the first communication unit 232, and generates an operation screen corresponding to the operation type indicated in the operation type information by executing the first application program. The display unit 221 displays the generated operation screen corresponding to the operation type.

Here, the first application program is an operation program for the control apparatus 200 to operate the controlled apparatus 100. Furthermore, the second application program is an application program for providing the user with various services (display of video, communication with other apparatuses, and so on) by the controlled apparatus 100.

Described below are more specific configuration and processing of the control apparatus 200 and the controlled apparatus 100, when the control apparatus 200 is a mobile terminal such as a smartphone and the controlled apparatus 100 is a DTV.

FIG. 3 is a block diagram showing a specific configuration example of the control apparatus 200 and the controlled apparatus 100 according to the embodiment.

The second execution unit 100 of the controlled apparatus 100 executes application programs (herein after referred to as "applications") such as a broadcast viewing application 101 for viewing broadcast programs, a browser application 102 for allowing the user to view web pages etc. on the Internet, and so on. The broadcast viewing application 101 and the browser application 102 are an example of the second application program.

Specifically, each of the applications is executed via a graphical user interface (GUI) control unit 111 of the second execution unit 110. Each application receives, from the GUI control unit 111, operation information described later. Furthermore, each application outputs GUI screen information in order to request the GUI control unit 111 to draw a GUI screen.

Upon receipt of the GUI screen information from the application, the GUI control unit 111 converts the received GUI screen information into a video signal, and transmits the signal to the display unit 121. Furthermore, the GUI control unit 111 identifies the operation type of the controlled apparatus 100 from the received GUI screen information. In other words, an operation type corresponding to the processing performed by the application is identified. A specific example of the operation type is described later using FIG. 6 and so on.

The display unit 121 displays the received video signal on the display. Furthermore, the video signal output from the GUI control unit 111 is also output to a video signal terminal (not shown).

It is to be noted that, when the controlled apparatus 100 is an apparatus which does not have a display apparatus for displaying video, such as an HDD recorder, the display unit 121 can be realized with an external display apparatus connected to a video terminal of the controlled apparatus 100.

In the present embodiment, the controlled apparatus 100 includes a dedicated remote controller (not shown) which communicates using infrared (IR) for example, and the user basically operates the controlled apparatus 100 through the dedicated remote controller.

Operation information of the dedicated remote controller (for example, pressing of a channel number button and a menu button) is received at an IR remote controller control unit 122, and the received operation information is notified to an input control unit 112.

The input control unit 112 is an element which gathers operation information on the controlled apparatus 100. For example, when a mouse (not shown) is connected, the input control unit 112 activates a mouse control unit 123 to receive operation information from the mouse. The input control unit 112 notifies the gathered operation information to the GUI control unit 111.

The GUI control unit 111 notifies the notified operation information to the application currently being executed. For example, when the broadcast viewing application 101 is being executed and a channel-up signal is being transmitted from the dedicated remote controller, the broadcast viewing application 101 changes the channel. In this manner, the controlled apparatus 100 executes an operation corresponding to the operation from the user.

In addition to the above processing, the controlled apparatus 100 in the present embodiment performs the following processing by the second communication unit 132 and a protocol processing unit 131. Specifically, the second communication unit 132 controls the network communication. Furthermore, the protocol processing unit 131 detects an apparatus on the internet 300 and processes an operational command from the control apparatus 200. Moreover, the operation type information generation unit 130 of the protocol processing unit 131 generates operation type information indicating the operation type identified by the GUI control unit 111.

For example, when the network 300 uses Ethernet (registered trademark), the second communication unit 132 corresponds to TCP/IP communications processing stack. Furthermore, the protocol processing unit 131 corresponds to, for example, Universal Plug and Play (UPnP) protocol stack. The protocol processing unit 131 replies to the apparatus detection command which is described later from the control apparatus 200, and performs processing to analyze the operational command from the control apparatus 200. A specific example of the processing performed by the protocol processing unit 131 is described later using FIG. 5 and so on.

The control apparatus 200 has almost the same configuration as the controlled apparatus 100, for the communication via the network 300. The control apparatus 200 executes a network remote control application 201 etc. for operating the controlled apparatus 100. The network remote control application 201 is an example of the first application program.

Since a type of processing performed by the GUI control unit 211, the display unit 221, the input control unit 212, and the first communication unit 232 is the same as that of their respective counterparts in the controlled apparatus 100, the description is omitted.

The control apparatus 200 differs from the controlled apparatus 100 in that the operation information identified from the gesture input made by the user to the operation screen is obtained by a touch-pad control unit 222 connected to the touch panel. In other words, the operational command generation unit 230 generates an operational command corresponding to the operation information obtained by the touch-pad control unit 222.

It is to be noted that the touch panel is located on a front surface of a panel, such as a liquid crystal display panel, of the display unit 221.

Furthermore, the protocol processing unit 231 is a counterpart of the protocol processing unit 131 provided for the controlled apparatus 100. Specifically, the protocol processing unit 231 detects the controlled apparatus 100 by transmitting an apparatus detection command.

Furthermore, the operational command generation unit 230 of the protocol processing unit 231 generates an operational command for controlling the controlled apparatus 100 in response to an operation performed on the network remote control application 201. The generated operational command is transmitted to the controlled apparatus 100 via the first communication unit 232.

Next, an operation performed by the network control system 10 in the embodiment is described with reference to FIG. 4 to FIG. 9.

Figure 4:
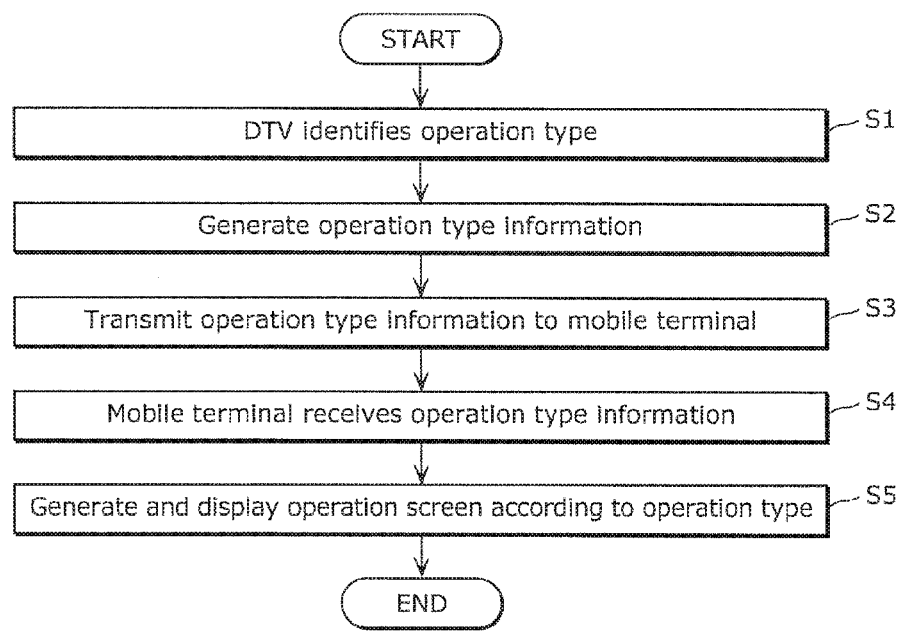
FIG. 4 is a flowchart showing an example of a flow of basic processing performed by the network control system according to the embodiment.

FIG. 4 is a flowchart showing an example of a flow of basic processing performed by the network control system 10 according to the embodiment. It is to be noted that, in FIG. 4, the "DTV" corresponds to the controlled apparatus 100 and the "mobile terminal" corresponds to the control apparatus 200. This goes the same for FIG. 5 described later.

In the network control system 10 according to the embodiment, the second execution unit 110 of the controlled apparatus 100 identifies the current operation type (S1).

The operation type information generation unit 130 of the controlled apparatus 100 generates operation type information indicating the identified operation type (S2).

The second communication unit 132 transmits the generated operation type information to the control apparatus 200 via the network 300 (S3).

The first communication unit 232 of the control apparatus 200 receives the operation type information (S4). The received operation type information is transmitted to the first execution unit 210, and an operation screen corresponding to the operation type indicated in the operation type information is generated. The generated operation screen is displayed on the display unit 221 (S5).

Figure 5:
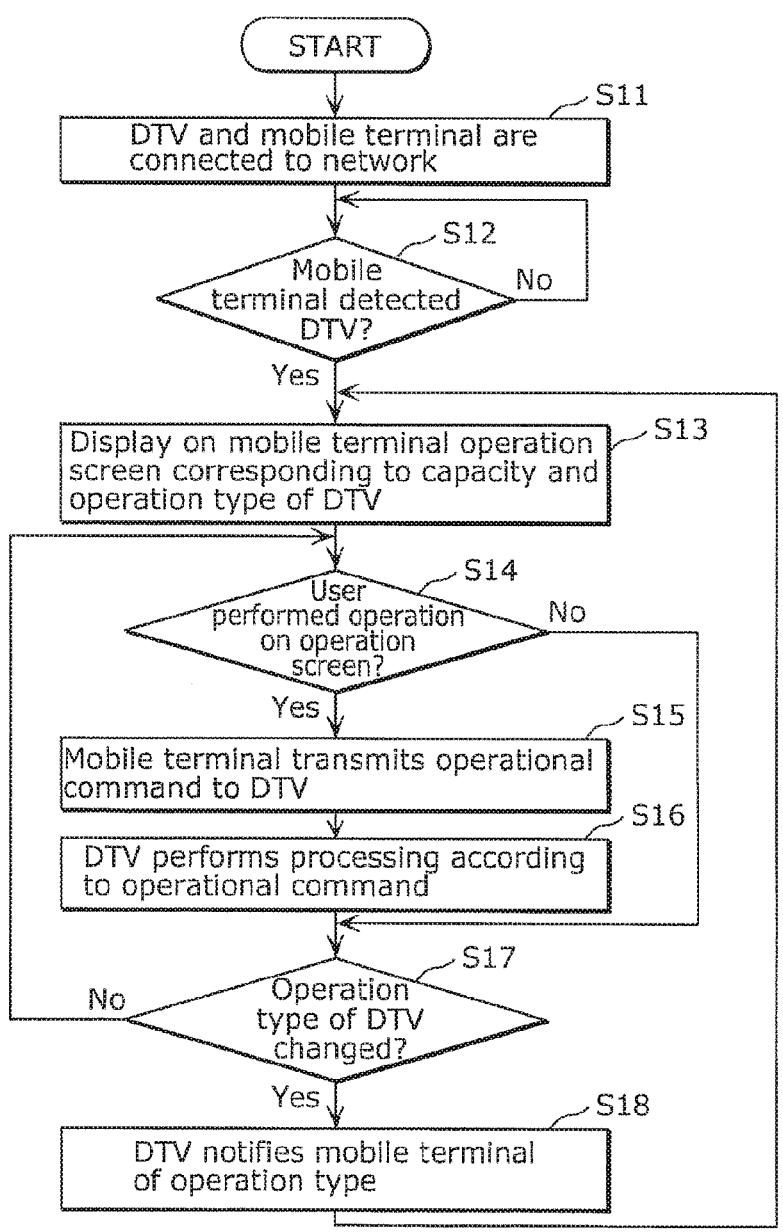
FIG. 5 is a flowchart showing an example of apparatus control performed by the network control system according to the embodiment.
Figure 6:
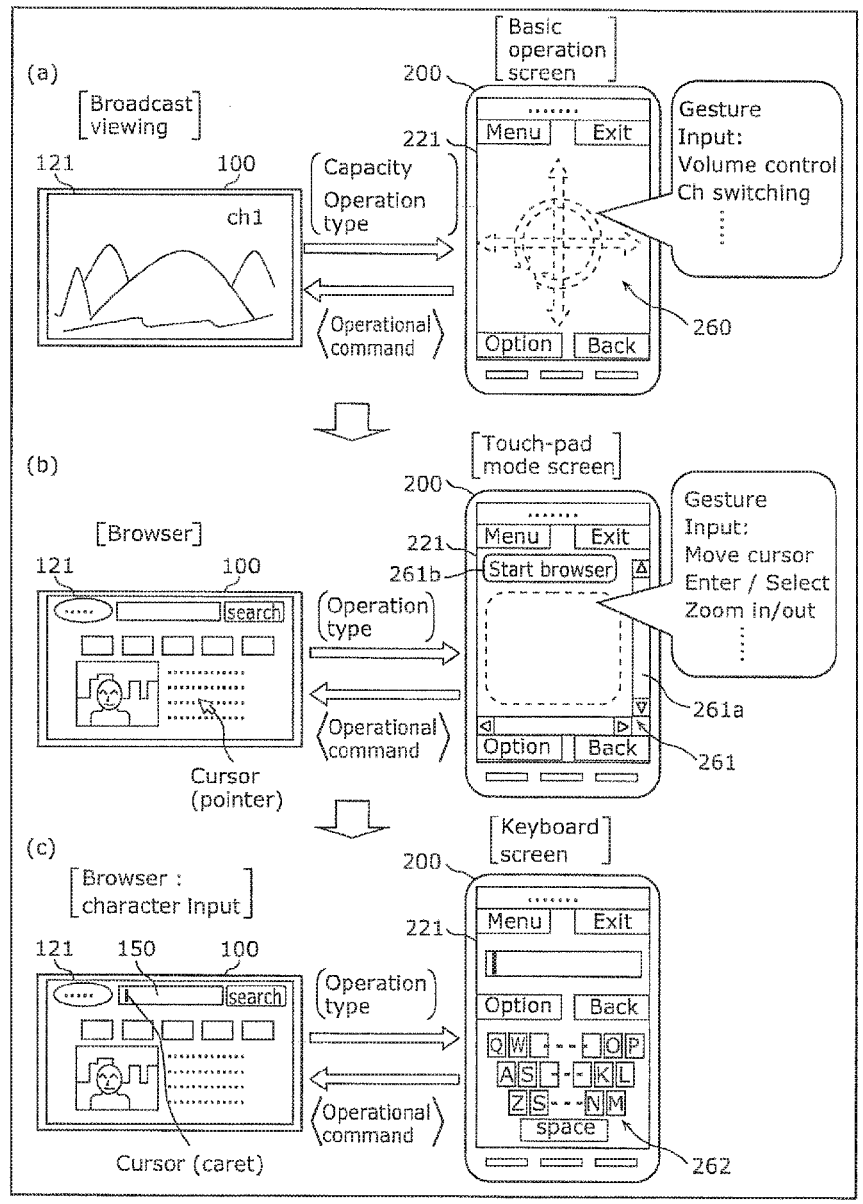
FIG. 6 shows a first example of transition to a different operation screen in the control apparatus according to the embodiment.

The following describes a specific behavior of the network control system 10 which performs the above basic processing using the flowchart shown in FIG. 5, and FIG. 6 which shows an example of the transition to a different operation screen displayed by the control apparatus 200.

First, when the controlled apparatus 100 and the control apparatus 200 are connected to the network 300, the second communication unit 132 and the first communication unit 232 complete preparation for communication by obtaining the IP address (S11).

When the above communication units are ready to communicate, the protocol processing unit 231 of the control apparatus 200 transmits an apparatus detection command. When no reply for the apparatus detection command is received (No in S12) the protocol processing unit 231 keeps transmitting the apparatus detection command periodically until the controlled apparatus 100 is detected.

When the controlled apparatus 100 receives the apparatus detection command, the protocol processing unit 131 transmits a reply packet. Thus, the control apparatus 200 detects the controlled apparatus 100 (Yes in S12).

The control apparatus 200 can obtain, by detecting the controlled apparatus 100, the capacity information and operation type information of the controlled apparatus 100.

The first execution unit 210 displays the optimal control operation screen based on the above information by executing the network remote control application 201, on the display unit 221 of the control apparatus 200 (S13).

Here, the capacity information is information on the processing capacity of the controlled apparatus 100, and is, for example, information on languages displayed and interpreted by the controlled apparatus 100, and on applications operable on the controlled apparatus 100. The capacity information is generated by, for example, the operation type information generation unit 130.

For example, when the controlled apparatus 100 can interpret English, capacity information indicating the fact is generated, and transmitted to the control apparatus 200. Upon receipt of the capacity information, the first execution unit 210 can cause the display unit 221 to display the description, name of the button, and so on in English, by executing the network remote control application 201.

Furthermore, for example, when the controlled apparatus 100 has three-dimensional (3D) display capacity, capacity information indicating the fact is generated, and transmitted to the control apparatus 200. Upon receipt of the capacity information, the first execution unit 210 can cause the display unit 221 to display a 3D setting button for 3D display setting of the controlled apparatus 100.

As described above, the operation type information is information on the type of operation accepted by the controlled apparatus 100, and an example of the operation type information includes the following various pieces of information:

(1) Information indicating that the controlled apparatus 100 accepts basic operation and is in a state to accept various commands each corresponding to each key of the IR remote controller provided;

(2) Information indicating that the controlled apparatus 100 is in a state to accept character strings;

(3) Information indicating that the controlled apparatus 100 is in a state to be operable with a mouse and is in a state to accept vector information;

(4) Information indicating that the controlled apparatus 100 is in a state to be operable with audio input and is in a state to accept audio information;

(5) Information indicating that the controlled apparatus 100 is in a state to accept gesture input or gyro operation; and (6) Information indicating that the controlled apparatus 100 is in a state to accept gamepad input.

As described above, the operation type information in the present embodiment is, more specifically, information identifying a type of operation accepted by the controlled apparatus 100 that is non-image information. In other words, the controlled apparatus 100 transmits to the control apparatus 200 not the operation screen itself but the operation type information indicating what type of operation can be accepted (that is the current operation type). Upon receipt of such operation type information, the control apparatus 200 generates and displays an operation screen corresponding to the operation type. Thus, the control apparatus 200 can control the controlled apparatus 100 more efficiently.

It is to be noted that each of the above (1) to (6) is an example of the operation type information, and the operation type information is not limited to the above information (1) to (6).

Furthermore, these operation types can be designated concurrently, and the first execution unit 210 may cause the display unit 221 to display an operation screen which satisfies all the operation types designated concurrently. Furthermore, the first execution unit 210 may select one of the operation types designated concurrently based on the priorities and the like, and cause the display unit 221 to display the optimal operation screen for the selected operation type.

Here, a case is assumed where the controlled apparatus 100 is in a state to accept the basic operation. In this case, the control apparatus 200 draws the basic operation screen 260 shown in (a) in FIG. 6 on the display unit 221 provided with a touch panel on the front surface.

For example, when the controlled apparatus 100 is executing the broadcast viewing application 101, the controlled apparatus 100 transmits: the operation type information indicating the above (1); and the capacity information indicating that the controlled apparatus 100 is displaying in Japanese, to the control apparatus 200 by the second communication unit 132.

Thus, the basic operation screen 260 shown in (a) in FIG. 6 for example is displayed on the display unit 221 of the control apparatus 200. In the basic operation screen 260, for example the user can transmit to the controlled apparatus 100 an instruction for volume control, channel switch, and so on, with gesture input. The gesture input is an input scheme by which the user performs gesture operation on the operation screen for inputting an instruction corresponding to the gesture to an apparatus.

Such gesture operation includes: swipe operation to swipe the surface of the touch panel (display unit 221) with one or more fingers; or tap operation to tap the surface one or more times with a finger.

When the user performs the above-described operation on the operation screen displayed on the display unit 221 (Yes in S14), the operational command generation unit 230 of the protocol processing unit 231 generates an operational command corresponding to the operation. The generated operational command is transmitted to the controlled apparatus 100 via the first communication unit 232 (S15).

Here, as an example, it is assumed that the user has performed a gesture operation to swipe the touch panel in the upper direction. In this case, the control apparatus 200 transmits, as an operational command, an operational command including an IR remote control code that corresponds to the channel-up to the controlled apparatus 100 via the network 300.

In the controlled apparatus 100, when the second communication unit 131 receives the above operational command, the protocol processing unit 131 interprets the content of the operational command. The protocol processing unit 131 notifies the interpreted content, via the input control unit 112 and the GUI control unit 111, to the application being executed (here, the broadcast viewing application 101). The broadcast viewing application 101 changes the channel to the next higher channel, as processing corresponding to the operational command (S16).

It is to be noted that, in the basic operation screen 260 shown in (a) in FIG. 6, various operational commands are associated with various gesture operation. However, the control apparatus 200 does not necessarily have to support information input by gesture operation (gesture input). For example, the control apparatus 200 may be provided with a channel change button for controlling channel-up and channel-down.

Furthermore, the type of the gesture operation associated with the operational command by the control apparatus 200 is not specifically limited. For example, an operational command indicating channel-up may be transmitted to the controlled apparatus 100, when the touch panel is swiped with two fingers in the upper direction.

Furthermore, for example, when the touch panel is swiped with two fingers in the lower direction, an operational command indicating channel-down may be transmitted to the controlled apparatus 100.

Furthermore, for example, when the touch panel is swiped with two fingers to the right, an operational command indicating input switching may be transmitted, and when the touch panel is swiped with two fingers to the left, an operational command indicating broadcast wave switching may be transmitted, to the controlled apparatus 100.

Moreover, another example for associating the gesture operation and the operational command includes: in the case where the user touches the touch panel with two or more fingers, volume up when the user moves the fingers to draw a circle to the right, while volume down when the user moves the fingers to draw a circle to the left; and mute when the user pinched the touch panel with two fingers (performed pitch operation).

Furthermore, a button may be displayed to turn off the controlled apparatus 100 by shuffling the control apparatus 200 (shaking the control apparatus 200). Furthermore, the control apparatus 200 may transmit an operational command instructing turning off the controlled apparatus 100 when the button to turn off is pressed, and concurrently terminate the network remote control application 201 operating on the control apparatus 200.

After the processing or when no user operation is performed on the operation screen (No in S14), the control apparatus 200 checks whether a notification on a change in the operation type is received from the controlled apparatus 100 (S17). In other words, the control apparatus 200 checks whether new operation type information is received. When no new operation type information is received (No in S17), the control apparatus 200 proceeds to processing of S14 and waits for an operation from the user.

Here, as an example, it is assumed that a browser application 102 is activated while the controlled apparatus 100 is in a broadcast viewing state.

For example, a case is assumed in which, in a state shown in (a) in FIG. 6, the browser application 102 is activated as shown in (b) FIG. 6, and a certain web page is displayed on the display unit 121 of the controlled apparatus 100.

In this case, the operation type of the controlled apparatus 100 is changed, and the second execution unit 110 identifies the operation type after the change (Yes in S17).

Specifically, it is identified that a vector input (browser operation) can be accepted as the operation type after the change, and the identified operation type is notified from the controlled apparatus 100 to the control apparatus 200.

In other words, operation type information indicating that a cursor (also referred to as a pointer) is in a movable state is generated as information indicating the operation type after the change. The generated operation type information is transmitted from the controlled apparatus 100 to the control apparatus 200 (S18).

Upon receipt of the operation type information, in the control apparatus 200, the first execution unit 210 causes the display unit 221 to display, for example, the touch-pad mode screen 261 shown in (b) in FIG. 6 (S13). In other words, an operation screen corresponding to the operation type after the change is generated by the first execution unit 210.

In the touch-pad mode screen 261, an operational command is generated by the gesture operation performed on the touch-pad (realized by a touch panel provided on the front surface of the display unit 221, in the present embodiment).

Specifically, operational commands each corresponding to drag operation, tap operation, pinch operation, and so on performed on the touch-pad is transmitted from the control apparatus 200 to the controlled apparatus 100. In other words, in the touch-pad mode screen 261, various gesture inputs corresponding to various operational commands can be performed, in the same manner as in the basic operation screen 260.

In addition, as shown in (b) in FIG. 6, a scroll bar 261a may be displayed on the touch-pad mode screen 261. This can also make it possible to transmit a page scroll command to the controlled apparatus 100.

Furthermore, a browser activation button 261b may be displayed on the touch-pad mode screen 261. When this browser activation button 261b is selected by the user, the control apparatus 200 obtains from the controlled apparatus 100 a uniform resource locator (URL) of the web page currently being displayed by the controlled apparatus 100, for example.

Moreover, the control apparatus 200 accesses the obtained URL, and displays the web page corresponding to the URL on the browser of the control apparatus 200. It is to be noted that when the URL indicates not a web page but multimedia content, the control apparatus 200 may activate a player corresponding to the multimedia content.

Here, a case is assumed in which, in response to the above-described operation performed by the user on the touch-pad mode screen 261, a cursor is in the character input filed 150 of the web page as shown in (c) in FIG. 6. It is to be noted that the cursor in the character input filed 150 is also described as a caret, for example.

In this case, the controlled apparatus 100 is in a state waiting for input of English character strings for example (Yes in S17), and transmits to the control apparatus 200 operation type information indicating the fact (S18).

With the transmission of the operation type information, the control apparatus 200 receives the notification of the operation type after the change, proceeds to processing of S13, and displays an operation screen suitable for the notified operation type.

Here, since the input waiting state for English character strings is notified, the control apparatus 200 displays, for example as shown in (c) in FIG. 6, the English keyboard screen 262 on the touch panel.

More specifically, the first execution unit 210 causes the display unit 221 to display the English keyboard screen 262 that is the operation screen corresponding to the operation type.

In other words, the operation screen displayed on the control apparatus 200 is automatically switched in response to the change in the operation type of the controlled apparatus 100. Thus, the user can easily know that the controlled apparatus 100 is waiting for an input of English character strings. Moreover, the user can input character strings to the controlled apparatus 100 with the control apparatus 200 immediately, using the touch panel (display unit 221), a hardware keyboard (not shown), and so on, in the way he/she is used to.

Here, regarding the character string, when the controlled apparatus 100 is waiting not for English character strings but for number character strings, operation type information including information indicating the fact is transmitted from the controlled apparatus 100 to the control apparatus 200.

Figure 7:
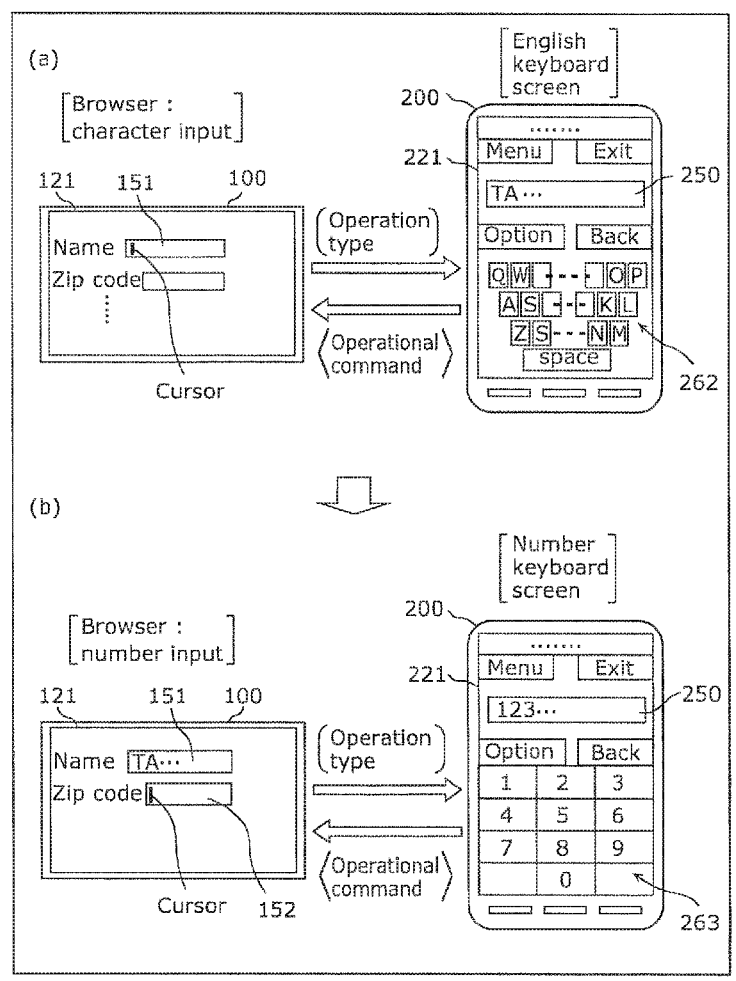
FIG. 7 shows a second example of transition to a different operation screen in the control apparatus according to the embodiment.

For example, as shown in (a) in FIG. 7, a case is assumed in which the cursor is in the character input field 151 and the controlled apparatus 100 is waiting for an input of an English character string. In this case, in the same manner as in (c) in FIG. 6, the English keyboard screen 262 is displayed on the control apparatus 200.

Furthermore, the character string displayed in the display field 250, which is for displaying the input character on the English keyboard screen 262, is transmitted to the controlled apparatus 100 by a predetermined operation and is input to the character input field 151.

It is to be noted that how to transmit one or more characters from the control apparatus 200 to the controlled apparatus 100 is described later with reference to FIG. 8 and FIG. 9.

Assume that, for example as shown in (b) in FIG. 7, the cursor is moved to the number input field 152 to which numbers such as a postal code is desired to be input.

In this case, the operation type information indicating that the controlled apparatus 100 is waiting for an input of a number character string is transmitted from the controlled apparatus 100 to the control apparatus 200.

As a result, the control apparatus 200 displays a number keyboard screen 263 as shown in (b) in FIG. 7. Thus, the user can input numbers immediately.

Furthermore, as described above, the controlled apparatus 100 can include, in the operation type information, information other than the keyboard type which is information indicating the controlled apparatus 100 is waiting for input of what type of character string, and notify the information to the control apparatus 200.

For example, regarding the character string input scheme, the controlled apparatus 100 may notify the control apparatus 200 of operation type information indicating whether the controlled apparatus 100 prefers characters to be input character by character or characters by characters.

As an example, a case is assumed in which the controlled apparatus 100 transmits to the control apparatus 200 information indicating that characters should be input characters by characters, as information indicating the character string input scheme. In this case, in the control apparatus 200, a transmission button 251 displaying "GO" is displayed on the English keyboard screen 262 as shown in (a) in FIG. 8. Specifically, the first execution unit 210 which has received the input scheme information causes the display unit 221 to display the English keyboard screen 262 including the transmission button 251.

In this case, the characters input to the control apparatus 200 using the English keyboard screen 262 and then displayed in the display field 250 are simultaneously transmitted to the controlled apparatus 100 through the selection of the transmission button 251 by the user. Furthermore, as shown in (b) in FIG. 8, the characters are displayed in the character input field 150 displayed on the controlled apparatus 100.

Furthermore, as an example, a case is assumed in which the controlled apparatus 100 transmits to the control apparatus 200 operation type information indicating that characters should be input character by character, as information indicating the character string input scheme. In this case, as shown in (a) and (b) in FIG. 9, the control apparatus 200 transmits the characters input using the English keyboard screen 262 character by character, to the controlled apparatus 100.

Specifically, upon reception of the information, the network remote control application 201 causes one character which is input to the English keyboard screen 262 to be displayed in the display field 250 for a predetermined time period, and then transmitted to the controlled apparatus 100.

Figure 9:
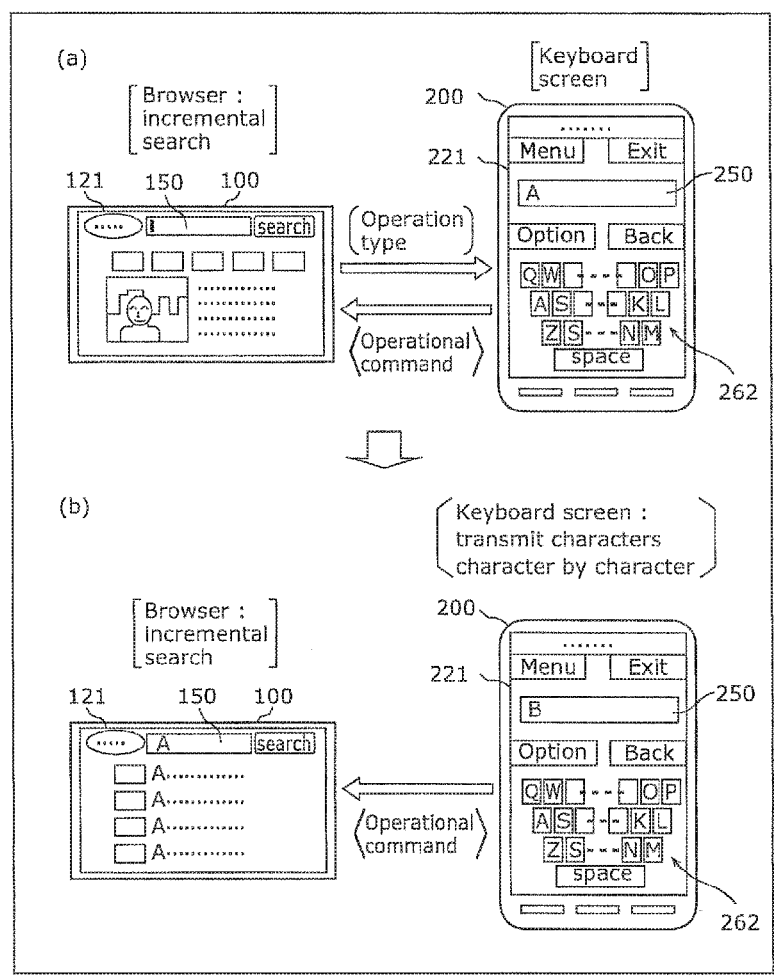
FIG. 9 shows a fourth example of transition to a different operation screen in the control apparatus according to the embodiment.

In other words, as shown in (a) in FIG. 9, the character "A", which is displayed in the display field 250 in response to the operation performed on the English keyboard screen 262, is transmitted to the controlled apparatus 100 without waiting for any operation by the user. As a result, as shown in (b) in FIG. 9, on the controlled apparatus 100, the character "A" is displayed in the character input field 150.

It is to be noted that the characters displayed in the display field 250 may be updated (overwritten) with characters input to the control apparatus 200 next, and may be displayed in parallel with the next characters.

As described above, with the controlled apparatus 100 according to the present embodiment, operation type information indicating at least one of the keyboard type and the character string input scheme for use in the operation type identified by the second execution unit 110 is generated and transmitted to the control apparatus 200.

Here, the above-described character-by-character input is suitable for search string input to a search screen, for example. Specifically, as shown in FIG. 9, the controlled apparatus 100 realizes display of search result of incremental search in which the search result is updated on a received character-by-character basis.

Figure 8:
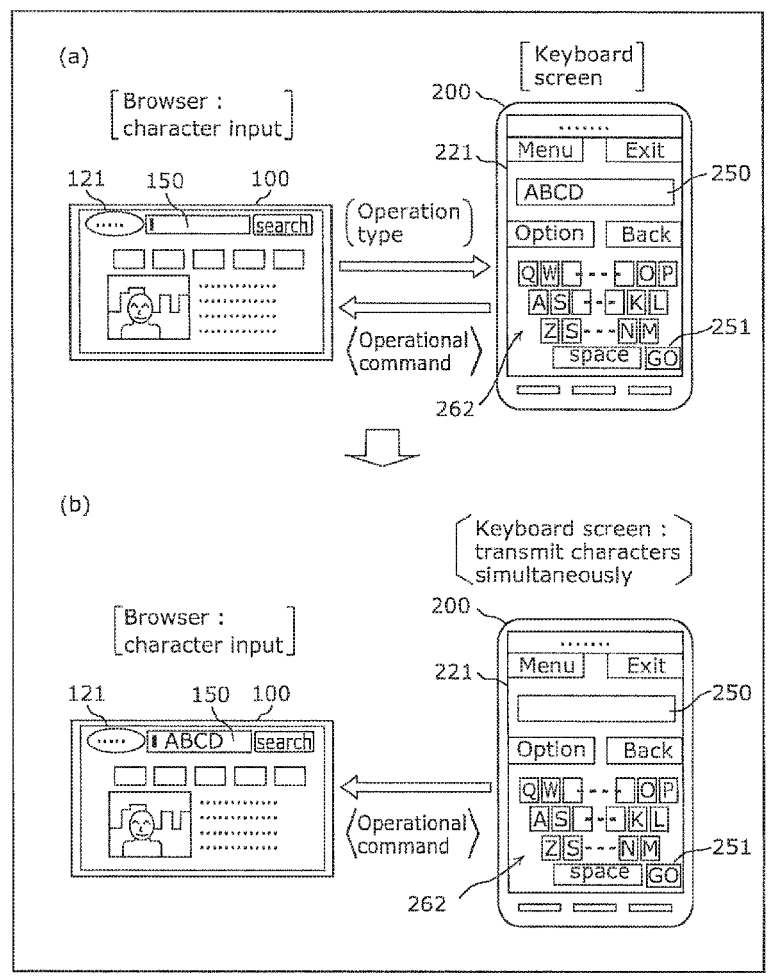
FIG. 8 shows a third example of transition to a different operation screen in the control apparatus according to the embodiment.

Furthermore, in the case of characters-by-characters input as shown in FIG. 8, for example, it is possible to transmit the characters after the control apparatus 200 has completed kana-kanji conversion. Accordingly, the input scheme is suitable for the case where it is required to input a long sentence to the controlled apparatus 100, such as when the controlled apparatus 100 is executing a mail application.

As described above, with the controlled apparatus 100 according to the present embodiment, the operation type of the controlled apparatus 100 can be notified to the control apparatus 200, and the control apparatus 200 can automatically display an operation screen suitable for the notified operation type.

It is to be noted that when the controlled apparatus 100 is no longer waiting for input of a character string (for example, when the browser application 102 is deactivated), the controlled apparatus 100 notifies the fact as the operation type information to the control apparatus 200. Thus, the control apparatus 200 can display the basic operation screen 260 again.

As described above, with the network control system 10 according to the embodiment of the present invention, the user can operate the controlled apparatus 100 intuitively and easily using the control apparatus 200. In other words, processing for the operation from the control apparatus 200 to the controlled apparatus 100 is performed efficiently.

The network control system according to an aspect of the present invention has been described based on the embodiment. However, the present invention is not limited to the embodiment. Other forms in which various modifications apparent to those skilled in the art are applied to the embodiment, or forms structured by combining elements of different embodiments are included within the scope of the present invention, unless such changes and modifications depart from the scope of the present invention.

For example, the network control system 10 in the present embodiment may include a plurality of controlled apparatuses including the controlled apparatus 100. In other words, the network control system 10 may include a plurality of controlled apparatuses operable from the network control system 10 and the control apparatus 200.

The control apparatus 200 can detect such controlled apparatuses by, for example, broadcasting an apparatus detecting packet to the network 300. Furthermore, the control apparatus 200 may display, when detecting controlled apparatuses, a selection screen for allowing the user to select one of the controlled apparatuses to be operated.

Furthermore, the controlled apparatuses do not have to be of the same type. For example, if the DTV, HDD recorder, and BD player have a function structure as the controlled apparatus 100 shown in FIG. 2, the control apparatus 200 can control these apparatuses efficiently.

Furthermore, as an example of the operation screen to be displayed on the control apparatus 200 when the controlled apparatus 100 is waiting for input of a character string, the English keyboard screen 262 is shown in FIG. 6 and others.

However, a keyboard screen dedicated to input of languages other than English, such as Japanese, may be displayed on the control apparatus 200 when the controlled apparatus 100 is waiting for input of a character string.

In this case, it is sufficient if information indicating a type of language of the keyboard is included in the operation type information transmitted from the controlled apparatus 100. Furthermore, the control apparatus 200 may generate and display a keyboard screen suitable for a language which can be handled by the controlled apparatus 100 indicated in the capacity information transmitted from the controlled apparatus 100.

INDUSTRIAL APPLICABILITY

With the present invention, users can operate digital home electronic apparatuses more easily. In other words, it is possible for a control apparatus to efficiently operate a digital home electronic apparatus which is a controlled apparatus. Accordingly, the present invention is useful as a network control system or the like for controlling digital home electronic apparatuses via a network.

REFERENCE SIGNS LIST

10 Network control system
100 Controlled apparatus
101 Broadcast viewing application
102 Browser application
110 Second execution unit
111, 211 GUI control unit
112, 212 Input control unit
121, 221 Display unit
122 IR Remote controller controlling unit
123 Mouse control unit
130 Operation type information generation unit
131, 231 Protocol processing unit
132 Second communication unit
150, 151 Character input field
152 Number input field
200 Control apparatus
201 Network remote control application
210 First execution unit
222 Touch-pad control unit
230 Operational command generation unit
232 First communication unit
250 Display field
251 Transmission button
260 Basic operation screen
261 Touch-pad mode screen
261a Scroll bar
261b Browser activation button
262 English keyboard screen
263 Number keyboard screen
300 Network

The invention claimed is:

1. A controlled apparatus which performs processing corresponding to an operational command transmitted from a control apparatus via a network, the controlled apparatus comprising:
  an execution unit configured to execute an application program, and identify an operation type which corresponds to processing performed by the application program and is a type of operation accepted on an operation screen output by the controlled apparatus;
  an operation type information generation unit configured to generate operation type information indicating the identified operation type; and
  a communication unit configured to output the generated operation type information to the network, wherein:
  the execution unit is configured to, when a change in an operation type occurs, identify the operation type after the change, the change in an operation type being caused by a change in the operation screen,
  the operation type information generation unit is configured to generate operation type information indicating the operation type after the change,
  the communication unit is configured to output the generated operation type information indicating the operation type after the change to the network,
  the execution unit is configured to, when the operation screen is changed from a state where a cursor is movable to a state where the cursor is in a character input field, identify a state of waiting for an input of character strings, as the operation type after the change,
  the operation type information generation unit is configured to generate the operation type information indicating the state of waiting for the input of character strings,
  the communication unit is configured to output the operation type information indicating the state of waiting for the input of character strings, to the network,
  the operation type information generation unit is configured to generate the operation type information including a keyboard type which is information indicating that the controlled apparatus is in a state of waiting for the input of an English character string or in a state of waiting for the input of a number character string, and the keyboard type is the identified operation type.

2. An apparatus control method for a controlled apparatus which performs processing corresponding to an operational command transmitted from a control apparatus via a network, the apparatus control method comprising:

executing an application program;

identifying an operation type which corresponds to processing performed by the application program and is a type of operation accepted on an operation screen output by the controlled apparatus;

generating operation type information indicating the identified operation type; and outputting the generated operation type information to the network, wherein:

in the identifying, when a change in an operation type occurs, the operation type after the change is identified, the change in an operation type being caused by a change in the operation screen, in the generating, operation type information indicating the operation type after the change is generated, in the outputting, the generated operation type information indicating the operation type after the change is output to the network, in the identifying, when the operation screen is changed from a state where a cursor is movable to a state where the cursor is in the character input field, a state of waiting for an input of character strings is identified as the operation type after the change, in the generating, the operation type information indicating the state of waiting for the input of character strings is generated, in the outputting, the operation type information indicating the state of waiting for the input of character strings is output to the network, in the generating, the operation type information including a keyboard type, which is information indicating the controlled apparatus is in a state of waiting for the input of an English character string or in a state of waiting for the input of a number character string, and the keyboard type is the identified operation type.

3. A controlled apparatus which performs processing corresponding to an operational command transmitted from a control apparatus via a network, the controlled apparatus comprising:

an execution unit configured to execute an application program, and identify an operation type which corresponds to processing performed by the application program and is a type of operation accepted on an operation screen output by the controlled apparatus;

an operation type information generation unit configured to generate operation type information indicating the identified operation type; and a communication unit configured to output the generated operation type information to the network, wherein:

the execution unit is configured to, when a change in an operation type occurs, identify the operation type after the change, the change in an operation type being caused by a change in the operation screen, the operation type information generation unit is configured to generate operation type information indicating the operation type after the change, the communication unit is configured to output the generated operation type information indicating the operation type after the change to the network, the execution unit is configured to, when the operation screen is changed from a state where a cursor is movable to a state where the cursor is in a character input field, identify a state of waiting for an input of character strings, as the operation type after the change, the operation type information generation unit is configured to generate the operation type information indicating the state of waiting for the input of character strings, the communication unit is configured to output the operation type information indicating the state of waiting for the input of character strings, to the network, the operation type information generation unit is further configured to generate capacity information identifying one of (i) a language outputtable or interpretable by the controlled apparatus and (ii) information indicating an application program executable by the execution unit, and the communication unit is configured to output the operation type information and the capacity information to the network.

* * * * *